United States Patent [19]

Halliwell

[11] Patent Number: 4,675,665
[45] Date of Patent: Jun. 23, 1987

[54] REALTIME TRACKING OF A MOVABLE CURSOR

[75] Inventor: Harry Halliwell, Winchester, England

[73] Assignee: International Business Machines Corporation, Armonk, N.Y.

[21] Appl. No.: 563,721

[22] Filed: Dec. 20, 1983

[30] Foreign Application Priority Data

Dec. 22, 1982 [EP] European Pat. Off. ........ 82306864.8

[51] Int. Cl.[4] .............................................. G09G 3/02
[52] U.S. Cl. .................................... 340/707; 340/706; 340/789; 178/18
[58] Field of Search ............... 340/706, 707, 708, 709, 340/710, 789; 178/18

[56] References Cited

U.S. PATENT DOCUMENTS

| | | | |
|---|---|---|---|
| 3,505,561 | 4/1970 | Ward et al. ............................ | 315/18 |
| 3,505,666 | 4/1970 | Thorpe . | |
| 3,651,508 | 3/1972 | Scarborough, Jr. et al. . | |
| 3,997,891 | 12/1976 | Iwamura et al. ..................... | 340/707 |
| 4,266,253 | 5/1981 | Matherat ............................. | 340/707 |
| 4,392,137 | 7/1983 | Intlekofer et al. ................... | 340/707 |
| 4,468,662 | 8/1984 | Tanaka ............................... | 340/789 |

OTHER PUBLICATIONS

IBM Technical Disclosure Bulletin, vol. 21, No. 6, Nov. 1978, "Direct-View Storage Tube Light Pen Attachment" by W. F. Beausoleil & R. A. Linton, p. 2450.

Proceeding of the S.I.D., vol. 14/2, Second Quarter 1973, "An Improved Light Gun Tracking Algorithm Based On a Recursive Digital Filter" by Murray Kasselman, pp. 52-61.

Computer, vol. 9, No. 4, Apr. 1976, "Using a Microprocessor In An Intelligent Graphics Terminal" by J. Raymond and D. K. Banerji, pp. 18-25.

Proc. IEE, vol. 12, Dec. 1976, "High-Speed Interactive Graphical-Display System" by C. R. C. Parker & J. B. Gosling, pp. 1293-1298.

Primary Examiner—Gerald L. Brigance
Assistant Examiner—Jeffery A. Brier
Attorney, Agent, or Firm—Earl C. Hancock; Carl M. Wright

[57] ABSTRACT

A method and apparatus for continuously updating a display of the coordinates of a light pen as it moves across a display screen involves executing a single iteration of an approximation calculation every refresh cycle of the display. The absolute screen coordinates are updated by the light pen tracking system and converted to application parameters written by the host computer into the display buffer work space. The orthogonal displacements, dx and dy, from a fixed reference point are determined. The distance and direction values from the reference point are converted to character form and inserted in the display buffer.

6 Claims, 2 Drawing Figures

REALTIME TRACKING OF A MOVABLE CURSOR

This application claims priority under 35 USC 119, based upon European Application Ser. No. 82306864.8 filed Dec. 22, 1982.

BACKGROUND OF THE INVENTION

1. Field of the Invention

This invention relates to graphic data display systems and particularly to such systems in which the position of a locator such as a light pen is displayed.

2. Description of the Prior Art

Users of graphic data display systems use locators such as light pens for cathode ray tube display or styli for tablets for drawing on the display area. Engineering drawings generated in this manner are required to be accurate within specified tolerances as the resultant drawing can be used directly to control a manufacturing operation under a so-called CAD/CAM system. One such system is the IBM 7361 Fastdraft System (IBM is a Registered Trade Mark). The IBM 7361 Fastdraft system includes an IBM 3251 display having a keyboard and a light pen, these comprise a drafting workstation. The display screen displays menus and images within a viewing area. When it is needed, a tracking cross for tracking light pen movement is displayed.

In the IBM 3250 Display System because of the time required for calculations, a digital read-out of the distance and direction traversed by a light pen on the refreshed display is not available until the movement of the light pen is complete. The calculation of the distance and angle traversed by the light pen is performed by the host computer after an interrupt to perform the calculation. This interrupt occurs when the light pen reaches its final point. Such a process is too slow to permit the parameters of the light pen position to be continuously displayed during the light pen movement.

The article 'An Improved Light Pen Tracking Algorithm Based on a Recursive Digital Filter' by Murray Kesselman—Proceedings of the S.I.D. Vol. 14/2 Second Quarter 1973 p. 52 et seq describes an algorithm for light pen tracking that can be used in a time sharing environment. The algorithm is only used for tracking and not for providing a display of a light pen position.

A different scheme to identify the position of a light pen is proposed in the article 'Direct-View Storage Tube Light Pen Attachment' by W. F. Beausoleil and R. A. Linton, IBM Technical Disclosure Bulletin Vol. 21, No. 6, November 1978, p. 2450. The direct view storage tube has circuitry which is used to cause the display screen to be scanned by a series of horizontal lines until a pen hit occurs. The coordinates of the pen are then transmitted to a host computer. No refresh buffer is required in the terminal to provide the scanning function which is performed in the write through mode.

In order to display the pen position using the Beausoleil-Linton scheme the host computer has to calculate the coordinates and transmit the result to the display terminal. As with the IBM 3250 Display System this does not permit a continuously updated display during the movement of the pen.

SUMMARY OF THE INVENTION

An object of the present invention is to provide a display of a locator position that changes continuously during the movement of the locator across a display area.

The present invention provides a method and apparatus whereby the light pen position parameters can be determined directly by the local display processor, that is a microprocessor dedicated to controlling the display, so that the light pen position display can be updated each refresh cycle without interrupting and delaying the host computer.

According to the invention there is provided a method of providing a continuously updated display on a display device having a repeating refresh cycle of operations indicating the current position of a locator device in polar coordinates during the movement of the locator device across a display area including the steps of:

(a) obtaining control of the display processor at the end of each refresh cycle
(b) determining the distance and direction of the locator from a fixed reference point
(c) converting the resultant distance and direction values into character form and inserting the characters into a graphic order buffer from which the values will be displayed on the next refresh cycle
(d) returning control to the display processor to start the next refresh cycle.

According to a second aspect of the invention there is provided data display apparatus including a display device having a repeating refresh cycle of operations and means to indicate the current position of a locator device characterized in that the apparatus includes first means operable at the end of each refresh cycle to determine the distance and direction of the locator from a fixed reference point and provide the resultant values, and second means to convert the output of the first means into a character form and to insert the resultant characters into a graphic order buffer from which the values will be displayed on the next refresh cycle whereby the display device displays the current position of the locator device as it moves across a display area.

BRIEF DESCRIPTION OF THE DRAWING

In order that the invention may be fully understood a preferred embodiment will now be described with reference to the accompanying drawings in which.

DETAILED DESCRIPTION OF THE PREFERRED EMBODIMENT

Figure 1:
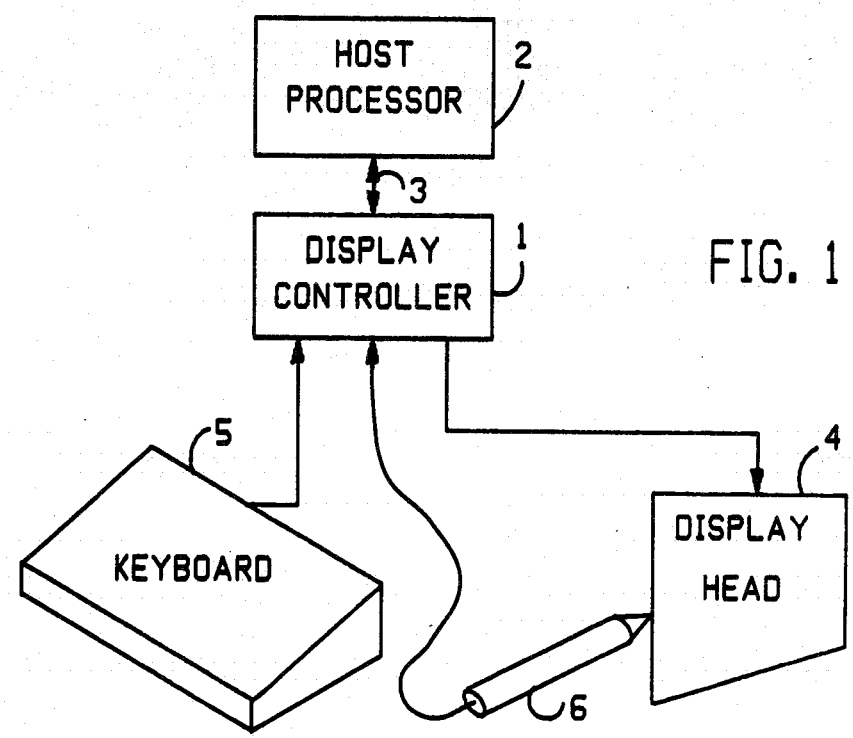
FIG. 1 is a block schematic diagram illustrating the components of a directed beam display system.

The preferred embodiment of the invention is in a directed beam display system such as shown FIG. 1. However the invention finds application in raster beam display devices and in tracking styli used on graphic tablets having an associated display.

In general terms the invention makes use of the microprocessor in the display controller that is dedicated to controlling the display so that the read-out can be updated each refresh cycle without interrupting and delaying the host computer. The method involves executing a single iteration of a Newton-Raphson approximation every refresh cycle of the display. In the first step the absolute screen coordinates are updated by the light pen tracking system and converted to application coordinates based on parameters written by the host computer into the display buffer work space. The orthogonal displacements, dx and dy, from a fixed reference point (also written in the work space) is determined by subtraction. The maximum of dx and dy is then determined.

The distance and direction values from a reference point are then determined, converted into character form and inserted into the display buffer orders. The results are then continuously updated on the screen.

In FIG. 1, a block schematic of a display system is shown. A display controller 1 is connected to a host data processing system 2 through a cable link 3. The controller 1 has connections to a display head 4, a keyboard 5, and a light pen 6. The system shown is typical of any IBM 3250 Display System and the controller 1 may also have a graphic tablet and stylus attached.

In such a system the user controls the light pen 6 to indicate portions of the display head screen or to draw lines on the screen. When the system is used for a computer aided design (CAD), then the accuracy with which drawings are generated is important. It is in helping the user to achieve accurate drawings that the invention finds its use.

Figure 2:
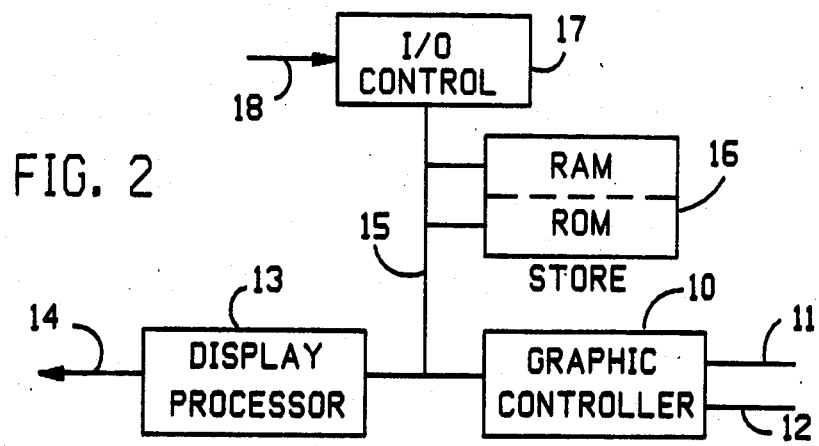
FIG. 2 is a block schematic diagram illustrating the component parts of a display terminal controller.

The display on the display head 4 is controlled by the controller 1. FIG. 2 is a block schematic of the portions of the controller which are used for implementing the preferred embodiment of the invention.

In FIG. 2, a graphic control processor 10 has output connections to the display head and the light pen on lines 11 and 12 and a display processor 13 has an input connection from the keyboard on a line 14. Both the graphic and display processors are connected to a common bus 15. A store 16 comprising a 32K Random Access Memory (RAM) and a 32K of RAM and Read Only Memory (ROM) is also connected to the common bus 15. An input-output controller 17 which has the line 18 connection to the host computer is also connected to the common bus 15.

The parameters for controlling the current display frame are contained in a refresh buffer which is part of the 32K RAM of store 16. During normal operation the display processor reads out the refresh buffer forty-six times a second and the graphic controller thus regenerates the display screen forty-six times a second. The control for the display processor is contained in the 32K RAM/ROM of store 16 and includes the control for implementing the present invention. This control may be implemented in a hard-wired logic circuit or as microcode stored in that 32K.

The RAM portion of store 16 includes a graphic order buffer into which a display of characters indicating the light pen position with regard to a reference point are placed.

During each refresh cycle the position of the light pen is noted by the graphic control processor and entered into parameter register in the RAM store.

In a directed beam display the refresh cycle is dependent upon the content of the screen. Thus a picture with only a few lines will have a much shorter refresh time than a more complex picture. A maximum refresh rate of 46 times a second, means that the nominal time for each cycle is 21 milliseconds. When the user is drawing lines the picture will be relatively simple and the processor will not need the 21 milliseconds to perform the refresh. It is the recognition of this factor that allows the implementation of the present invention without requiring additional processing capacity.

In operation of a display system the host computer will provide a menu display from which the user selects the operation that is to be performed. When the user requires to draw a line he points the light pen at the appropriate portion of the displayed menu. The host computer detects the light pen selection. If a 'draw' is required the host computer displays the appropriate pen follower symbol at a predetermined position on the screen. The parameters of the position are loaded into the controllers display buffer and these are used as the reference point for determining the movement of the light pen. The method of the preferred embodiment will now be described. At the end of each refresh cycle the control of the processor is obtained by the control code of the light pen tracking operation, the following steps are taken before the next refresh cycle starts.

Step 1

The screen coordinates of the light pen which have been updated by a light pen tracking routine during the previous refresh cycle, are converted, based on parameters written by the host computer into the display buffer, into orthogonal displacements (dx, dy) in application units from a fixed reference point.

Step 2

A comparison is made of dx and dy to determine the range in which the required angle falls, such that the tangent (t) of an angle less than 45° is calculated.

Step 3

The following table gives the quadrant range of the angle to be calculated (+x x is =0°). The maximum length (L) of dx and dy is calculated, as shown in the following table.

| dy + dx Result | dy − dx Result | Angle | L | t |
|---|---|---|---|---|
| + | + | 45–135 | dy | −dx/dy |
| − | + | 135–225 | −dx | dy/dx |
| − | − | 225–315 | −dy | dx/−dy |
| + | − | 315–45 | dx | dy/dx |

The special cases of dx=dy=0 or t=1 are recognized at this stage, and in these cases the following Step 4 is not needed.

In the general case, finding the polar coordinates is now reduced to finding the angle A and distance D in a right angle triangle in which D is the hypotenuse $=L\sqrt{1+t^2}$, L is the adjacent side to angle A and L.t where 0<t<1 is the opposite side.

Step 4

The control system then performs a single step of several Newton-Raphson approximations as follows:

(a) Expressing D as L(1 +s) it is required to solve:

$$(1+s)^2 = 1+t^2$$

The appropriate approximation is $$s' = \frac{s^2 - t^2}{2(1+s)}$$

(b) Expressing u'=tan (A/2) the appropriate approximation is:

$$u' = \frac{tu^2 + t}{2(tu + 1)}$$

(c) Expressing v=tan (A/4) the appropriate approximation is:

$$v' = \frac{uv^2 + u}{2(uv + 1)}$$

(d) Expressing w=tan (A/8), the appropriate approximation is:

$$w' = \frac{vw^2 + v}{2(vw + 1)}$$

The result of executing this step on successive display cycles is that s, u, v, w progressively approach the correct values describing the position of the light pen. If the light pen is moving they will effectively follow it. The range of values for w permits A/8 to be found with reasonable accuracy using only two terms of the arc tangent expansion. This convergence depends upon the parameters having been initially within certain ranges as follows:

s > −1
−1 < u < +1
−1 < v < +1
−1 < w < +1

Step 5

The distance and direction of the light pen from the fixed reference point are calculated using the current approximation of s and w. These are then converted into character form and inserted in the graphic order buffer so that the values will be displayed on the next refresh cycle.

Step 6

A check is made to determine whether a new position for the light pen is detected for several cycles, e.g. 4. If there is no new position then steps 4 and 5 are suppressed.

Step 7

Control is returned to the display processor to start the next refresh cycle and to display on the screen an indication of the light pen position in polar coordinates.

Although the present invention is described herein with particularity relative to the foregoing detailed description of an exemplary embodiment, various modifications, changes, additions, and applications of the present invention in addition to those mentioned herein will readily suggest themselves to those having normal skill in the art without departing from the spirit of this invention.

What is claimed is:

1. Data display apparatus including a display device having a repeating refresh cycle of operations and means for supplying the current position of a locator device, an initial position being used as a fixed reference point, comprising, in combination:

first means operable betwen successive refresh cycles for making a single iteration of an approximation of the distance and direction of the locator device from the fixed reference point and for supplying as output the resultant values of the approximation iteration, and second means for converting the output from the first means into a character form to be loaded into a graphic order buffer from which the values are displayed after the refresh cycle, whereby the display device displays the current position of the locator device as the latter moves across a display area.

2. Data display apparatus as claimed in claim 1 in which the first means is operable to determine the polar coordinates of the position of the locator device with respect to the fixed reference point by a series of approximation calculations, a single calculation being made between successive refresh cycles.

3. Data display apparatus as claimed in claim 1 in which the display device is a cathode ray tube and the locator device is a light pen.

4. Data display apparatus as claimed in claim 2 in which the display device is a cathode ray tube and the locator device is a light pen.

5. In a method of displaying information representing spatial data including a moveable cursor, said information being cyclically modified and redisplayed, and wherein the dx and dy position coordinate changes of the cursor are determined during each modification cycle, the improvement of approximating by an iterative procedure for cyclic display of the distance and angle of travel of said cursor from an initial position to a final position during successive modifications and display cycles comprising the following steps:

storing an initial set of x,y coordinate values representing the initial position;

performing one calculation of the iterative procedure during each successive modification cycle; and displaying successive approximations of the distance and angle of cursor travel during successive display cycles.

6. The method claimed in claim 5 further including the step of modifying said approximation procedure if at least one successively stored dx or dy coordinate value differs from zero, each successively stored dx and dy coordinate change value representing the final position.

* * * * *